(12) United States Patent
Spiers et al.

(10) Patent No.: US 9,183,031 B2
(45) Date of Patent: Nov. 10, 2015

(54) PROVISIONING OF A VIRTUAL MACHINE BY USING A SECURED ZONE OF A CLOUD ENVIRONMENT

(75) Inventors: Bradford T. Spiers, Bedminster, NJ (US); Miroslav Halas, Charlottesville, VA (US)

(73) Assignee: Bank of America Corporation, Charlotte, NC (US)

( * ) Notice: Subject to any disclaimer, the term of this patent is extended or adjusted under 35 U.S.C. 154(b) by 274 days.

(21) Appl. No.: 13/527,172

(22) Filed: Jun. 19, 2012

(65) Prior Publication Data

US 2013/0339949 A1  Dec. 19, 2013

(51) Int. Cl.
*G06F 9/455* (2006.01)
*G06F 9/50* (2006.01)

(52) U.S. Cl.
CPC .......... *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,146,305 B2 | 12/2006 | van der Made | |
| 7,805,375 B2 | 9/2010 | Fox et al. | |
| 7,849,462 B2 | 12/2010 | Traut et al. | |
| 7,870,153 B2 | 1/2011 | Croft et al. | |
| 8,161,479 B2 * | 4/2012 | Sedukhin et al. | 718/1 |
| 2006/0155674 A1 | 7/2006 | Traut et al. | |
| 2007/0180448 A1 | 8/2007 | Low et al. | |
| 2008/0201414 A1 | 8/2008 | Husain et al. | |
| 2009/0089860 A1 * | 4/2009 | Forrester et al. | 726/3 |
| 2009/0260007 A1 | 10/2009 | Beaty et al. | |
| 2010/0027552 A1 | 2/2010 | Hill | |
| 2010/0153482 A1 | 6/2010 | Kim et al. | |
| 2010/0223610 A1 | 9/2010 | DeHaan et al. | |
| 2010/0257523 A1 | 10/2010 | Frank | |
| 2011/0099548 A1 | 4/2011 | Shen et al. | |
| 2011/0145821 A1 | 6/2011 | Philipson et al. | |
| 2011/0179132 A1 | 7/2011 | Mayo et al. | |
| 2011/0258692 A1 | 10/2011 | Morrison et al. | |

(Continued)

FOREIGN PATENT DOCUMENTS

| | | |
|---|---|---|
| CN | 102033755 | 4/2011 |
| EP | 1761837 | 2/2006 |
| JP | 200781014 | 3/2007 |

OTHER PUBLICATIONS

International Search Report and Written Opion for International application No. PCT/US2013/037091 dated Oct. 25, 2013.

(Continued)

*Primary Examiner* — Sisley Kim
(74) *Attorney, Agent, or Firm* — Banner & Witcoff, Ltd.; Michael A. Springs

(57) ABSTRACT

Apparatuses, computer readable media, methods, and systems are described for providing a list of cloud orchestrator clients, each of the clients being associated with one of a plurality of cloud provider data centers, processing an instruction to at least one of create a virtual machine and change a state of the virtual machine, select a particular one of the cloud orchestrator clients associated with a particular one of the cloud provider data centers where the virtual machine is to be created or where the virtual machine currently resides, generating a provisioning request instructing the particular cloud orchestrator client to perform at least one of creating the virtual machine and changing the state of the virtual machine, and communicating the request to the particular cloud orchestrator client.

20 Claims, 7 Drawing Sheets

(56) References Cited

U.S. PATENT DOCUMENTS

2012/0060153 A1    3/2012  Bealkowski
2012/0147894 A1*   6/2012  Mulligan et al. ......... 370/395.53

OTHER PUBLICATIONS

BitVisor: A Thin Hypervisor for Enforcing I/O Device Security, Takahiro Shinagawa, et al., VEE'09, Mar. 11-13, 2009, © 2009, pp. 121-130.

Patentability Search Report prepared by Mogambo Solutions, Basic Patentability, Transmitting an Operating System Image Template between Computer Systems, Aug. 18, 2011, 9 pages.

Overshadow: A Virtualization-Based Approach to Retrofitting Protection in Commodity Operating Systems, Xiaoxin Chen, et al., ASPLOS'08, Mar. 1-5, 2008, ©2008, 12 pages.

Rapid Trust Establishment for Pervasive Personal Computing, Ajay Surie, et al., Published by the IEEE Computer Society, © 2007, pp. 24-30.

SoftUDC: A Software-Based Data Center for Utility Computing, Mahesh Kallahalla, et al., Published by the IEE Computer Society, © 2004, pp. 38-46.

Subverting Vista™Kernel For Fun And Profit, Joanna Rutkowska, Advanced Malware Labs, COESEINC, ® SyScan'06, Jul. 21, 2006, Singapore and Black Hat Briefings 2006, Aug. 3, 2006, Las Vegas, 52 pages.

Attack, solution and verification for shared authorisation data in TCG TPM, Liqun Chen, et al., HP Labs, UK and University of Birmingham, UK, 2009, 17 pages.

The future of cloud computing—Part 1: Recent history, Terrence Lillard, Sep. 5, 2011, http://www.eetimes.com/General/PrintView14219629, downloaded Dec. 27, 2011, 6 pages.

The future of cloud computing—Part 2: Current and next phases, Terrence Lillard, Sep. 19, 2011, http://www.eetimes.com/General/PrintView/4227429, downloaded Dec. 27, 2011, 8 pages.

HTTP booting and initramfs assembly, http://etherboot.org/wiki/screenshots, downloaded Jan. 3, 2012, 4 pages.

gPXE Secure Network Booting Project Proposal, http://etherboot.org/wiki/soc/derekpryor-proposal, downloaded Jan. 3, 2012, 1 page.

Etherboot image types, http://etherboot.org/wiki/eb_imagetypes, downloaded Jan. 3, 2012, 6 pages.

A typical network boot scenario, http://etherboot.org/wiki/scenario, downloaded Jan. 3, 2012 1 page.

SafeBootMode, http://etherboot.org/wiki/safebootmode, downloaded Jan. 3, 2012, 2 pages.

Flicker: Minimal TCB Code Execution, Jonathan M. McCune, Carnegie Mellon University, Mar. 27, 2008, 62 pages.

iPXE, http://ipxe.org/start, downloaded Jan. 3, 2012, 2 pages.

PowerPoint, Introduction to Network Booting Free Yourself From Your Hard Drive!, Joshua Oreman, Student Information Processing Board Massachusetts Institute of Technology, Independent Activities Period, Jan. 6, 2010, 27 pages.

TCG PC Client Specific Implementation Specification for Conventional BIOS, Version 1.20 FINAL, Revision 1.00, Jul. 13, 2005 for TPM Family 1.2: Level 2, © 2005 Trusted Computing Group, Incorporated, 119 pages.

Privacy CA, Sample Source Code, printed from http://www.privacyca.com/code.html on Sep. 13, 2011, 4 pages.

Trusted Computing: TCG proposals, Computer Society lecture notes, © 2006, Tien Tuan Anh Dinh et al., updated Nov. 4, 2006, 7 pages.

Trusted Platform on demand (TPod), Hiorshi Maruyama, et al., Feb. 1, 2004, 13 pages.

vTPM: Virtualizing the Trusted Platform Module, Stefan Berger, et al., IBM T.J. Watson Research Center, USENIX Association, Security '06: 15th USENIX Security Symposium, pp. 305-320.

Research and Design of Full Disk Encryption Based on Virtual Machine, Min Ling et al., © 2010 IEEE, pp. 642-646.

Symerton—Using Virtualization to Accelerate Packet Processing, Aaron R. Kunze, et al., ANCS'06, Dec. 3-5, 2006, pp. 133-142.

PowerPoint Symerton—Using Virtualization to Accelerate Packet Processing, Aaron R. Kunze, et al., Communications Technology Lab Corporate Technology Group, Dec. 4, 2006, 21 pages.

iPXE, http://en.wikipedia.org/wiki/IPXE, downloaded Jan. 3, 2012, 2 pages.

NIST Special Publication 800-145, The NIST Definition of Cloud Computing, Recommendations of the National Institute of Standards and Technology, Peter Mell et al., Sep. 2011, 7 pages.

Intel® Trusted Execution Technology: A Primer—Intel® Software Network, Matthew Gillespie, Jun. 1, 2009, 4 pages.

\* cited by examiner

PROVISIONING OF A VIRTUAL MACHINE BY USING A SECURED ZONE OF A CLOUD ENVIRONMENT

BACKGROUND

Cloud computing is becoming increasingly popular. Cloud computing may refer to aggregated resources that can be provisioned on demand. Cloud computing may involve cloud resources performing computations instead of, or in addition to, a user's computer. Cloud computing has been compared to a utility, where computing is the service being provided.

Conventional cloud computing may have issues when provisioning of virtual machines and may be using architecture models that are inefficient. In view of such issues, improvements in provisioning of virtual machines in cloud computing environments are needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of example embodiments, apparatuses, computer readable media, methods, and systems are described for provisioning of virtual machines in a cloud environment.

In some aspects, apparatuses, computer readable media, methods, and systems are described for providing a list of cloud orchestrator clients, each of the clients being associated with one of a plurality of cloud provider data centers, processing an instruction to perform at least one of creating a virtual machine and changing a state of the virtual machine, selecting a particular one of the cloud orchestrator clients associated with a particular cloud provider data centers where the virtual machine is to be created or where the virtual machine currently resides, generating a provisioning request instructing the particular cloud orchestrator client to perform at least one of creating the virtual machine and changing the state of the virtual machine, and communicating the request to the particular cloud orchestrator client.

In some aspects, apparatuses, computer readable media, methods, and systems are described for providing a cloud orchestrator client within a secured zone of a cloud provider, wherein the secured zone is associated with a tenant data center, processing, by the cloud orchestrator client, a request from a provisioning system for performing at least one of creating a virtual machine and changing a state of the virtual machine, communicating, by the cloud orchestrator client, an authorization request to a cloud orchestrator server associated with the provisioning system, in response to receiving an authorization approval response, calling, by the cloud orchestrator client, a cloud provider application programming interface (API) with an instruction to perform at least one of creating the virtual machine and changing a state of the virtual machine, and informing, by the cloud orchestrator client, the provisioning system of at least one of whether the virtual machine was successfully created and whether the state of the virtual machine was successfully changed.

Aspects of the embodiments may be provided in at least one non-transitory computer-readable medium and/or memory storing computer-executable instructions that, when executed by at least one processor, cause a computer or other apparatus to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
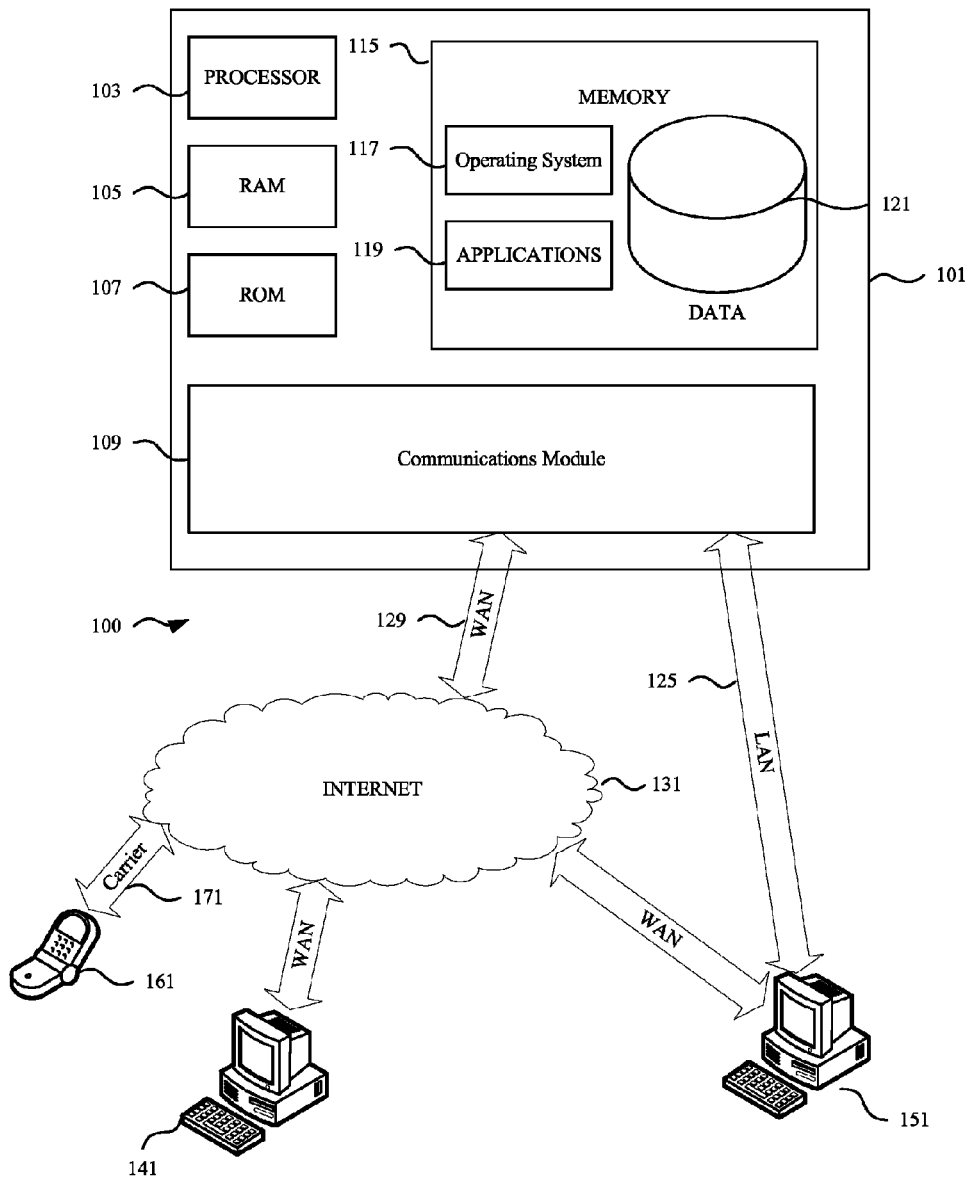
FIG. 1 shows an illustrative operating environment in which various aspects of the present disclosure may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

With reference to FIG. 1, the computing system environment 100 may include a computing device 101 having a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware. Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device (e.g., smart phone) communicating over wireless carrier channel 171.

The network connections depicted in FIG. 1 may include a local area network (LAN) 125 and a wide area network (WAN) 129, as well as other networks. When used in a LAN networking environment, computing device 101 may be connected to the LAN 125 through a network interface or adapter in the communications module 109. When used in a WAN networking environment, computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
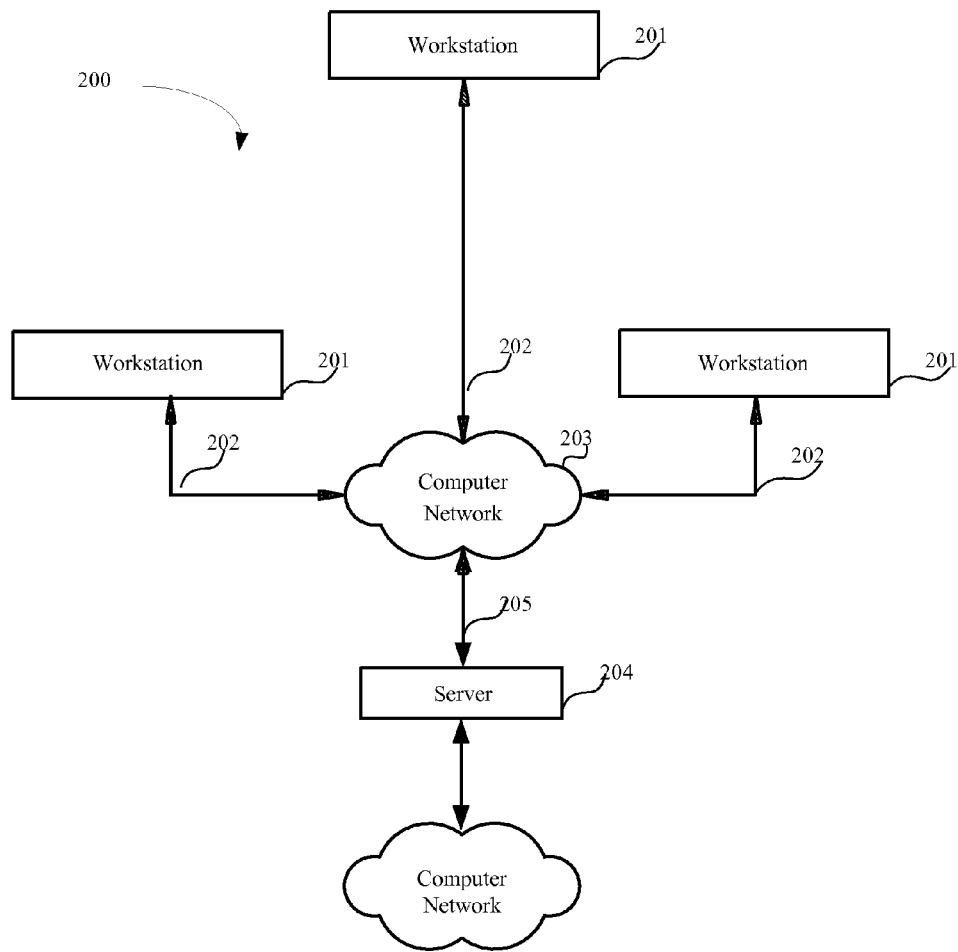
FIG. 2 is an illustrative block diagram of workstations and servers that may be used to implement the processes and functions of certain aspects of the present disclosure in accordance with example embodiments.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
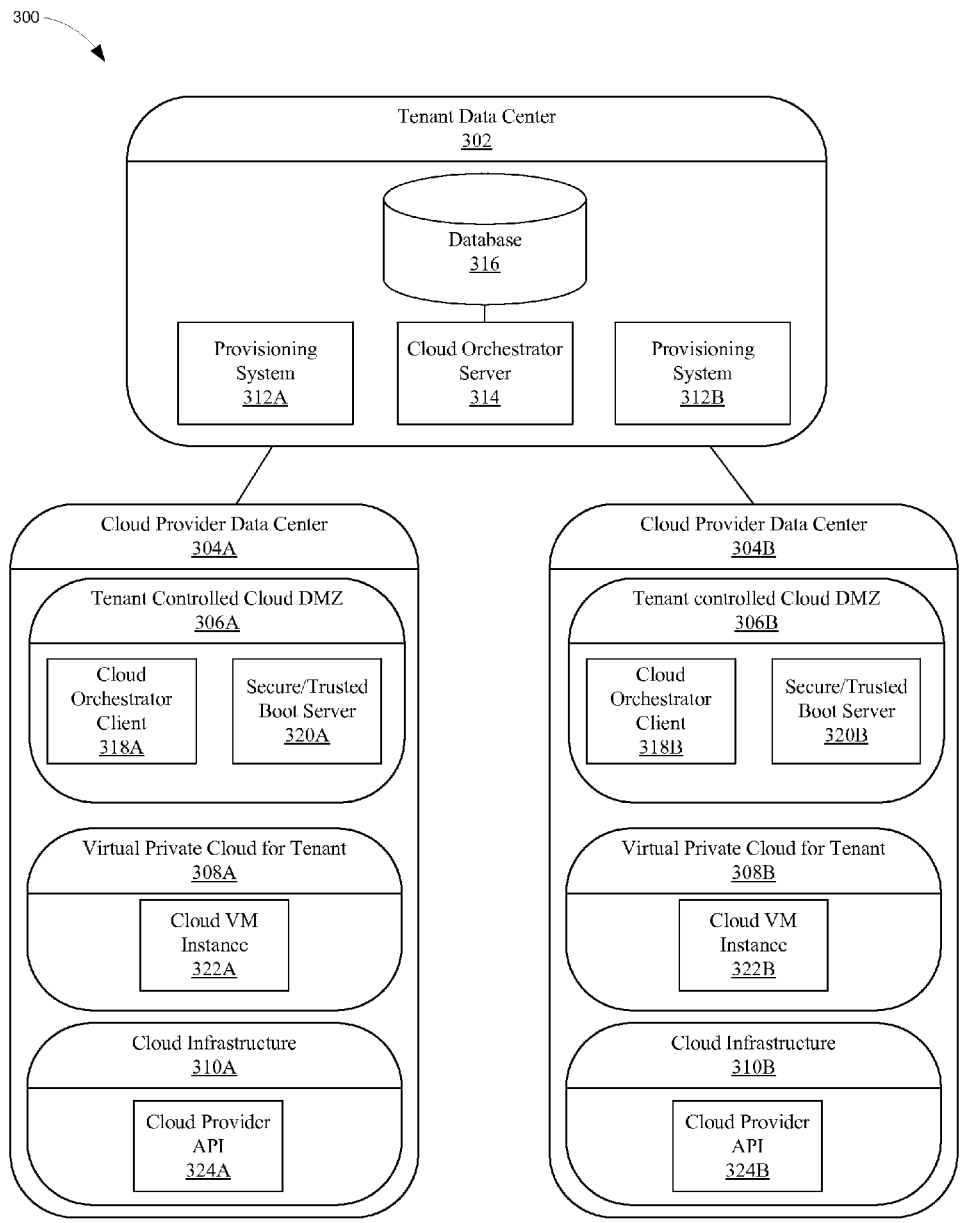
FIG. 3 illustrates a system in accordance with example embodiments of the disclosure.

FIG. 3 illustrates a system in accordance with example embodiments of the disclosure. System 300 may provide for provisioning of a virtual machine by using a cloud orchestrator client within a secured zone of a cloud provider data center. In an example, system 300 may include a tenant data center 302 and one or more cloud provider data centers 304A-B. A cloud provider may be an organization that creates a cloud platform used by one or more tenants to execute computational workloads. A tenant may be a user or an organization that uses the cloud platform to execute its computational workloads. The tenant data center 302 may include computer hardware (e.g., one or more computing devices 101) and software controlled by a tenant. Each of the cloud provider data centers 304A-B may include computer hardware (e.g., one or more computing devices 101) and software controlled by a respective cloud provider. Cloud provider data centers 304A-B may provide a computational service permitting one or more tenants to execute computational workloads using virtual machines (VMs). A cloud provider may also be one of the tenants.

Although only a single tenant data center and two cloud provider data centers are shown in FIG. 3, system 300 may include additional tenant data centers and cloud provider data centers. The components of the tenant data centers and the cloud provider data centers may be implemented by one or more of the computing devices 101, discussed above. Further, each of the tenant data centers and cloud provider data centers may include at least one processor and at least one memory storing executable instructions that, when executed by the at least one processor, respectively cause the tenant data centers and cloud provider data centers to perform the functions described herein.

In an example, tenant data center 302 may include one or more provisioning systems 312A-B, a cloud orchestrator server 314, and a database 316. A tenant user may use either or both of the provisioning systems 312A-B for initiating provisioning of one or more virtual machines on the cloud provider data centers 304A-B. In an example, provisioning system 312 may use a software tool for provisioning and changing states of VMs implemented by one or more cloud provider data centers 304. Provisioning systems 312A-B may permit tenants to control on which cloud provider data centers 304 virtual machines are deployed.

Cloud orchestrator server 314 may be a combination of hardware, software, and processes that provide automation and ensure authorization and entitlement of an instance of a VM. Cloud orchestrator server 314 may also track state and disposition of each VM instance throughout its entire life cycle, regardless of which cloud provider data center 304A-B is providing a particular VM instance.

Cloud provider data centers 304A-B may include computer hardware (e.g., one or more computing devices 101) and software controlled by one or more cloud providers. The cloud provider data center 304 may provide a computational service permitting one or more tenants to provision virtual machines (VMs) and to execute computational workloads using VMs. In an example, cloud provider data centers 304A-B may include tenant controlled cloud DMZs 306A-B, virtual private clouds for tenant 308A-B, and cloud infrastructure 310A-B. Cloud provider data centers 304A-B may provide secured zones within a cloud environment that may be trusted physical space over which the tenant has physical and logical control. An example of a secured zone is a tenant controlled cloud DMZ 306. The trusted physical space may include dedicated communication, storage, and computer components used for checking integrity, authenticity, and correctness of the cloud environment, and optimizing operation of cloud nodes. The tenant may use the cloud DMZ 306 as the basis from which to extend trust from an internal network of the tenant data center 302 into a cloud environment provided by a cloud provider data center 304. Because cloud DMZ 306 may be trusted, cloud DMZ 306 may be considered to be part of an internal network of the tenant data center 302, even though cloud DMZ is a part of the cloud environment.

In an example, tenant controlled cloud DMZ 306 may include a cloud orchestrator client 318 and a secure/trusted boot server 320. Cloud orchestrator client 318 may provide an interface with which provisioning systems 312 may interact to provision VMs. Cloud orchestrator client 318 may function as a cloud provider proxy and may be configured to directly call a cloud provider application programming interface (API) 324 of the cloud provider data center 304 in which client 318 resides. In an example, each cloud orchestrator client 318 may correspond to a single cloud provider data center 304, and may not be used to instantiate or modify VMs at other cloud provider data centers. Cloud orchestrator client 318 may provide, for example, a consistent interface for all of the provisioning systems 312 to access when provisioning VMs at the associated cloud provider data center 304. Each cloud orchestrator client 318 may be included within a corresponding Cloud DMZ 306. As seen in FIG. 3, for example, client 318A is included within Cloud DMZ 306A of cloud provider data center 304A, and client 318B is included within Cloud DMZ 306B of cloud provider data center 304B.

Cloud DMZ 306 may be created for a specific cloud provider data center 304 and therefore cloud orchestrator client 318 may also be specific to that cloud provider data center 304. For example, each client 318 may be created or configured to call only a specific cloud provider application programming interface (API) 324 of the cloud provider data center 304 in which client 318 resides. Each cloud provider API 324 may be specific to a particular cloud provider data center 304. In an example, cloud orchestrator client 318A may only be able to call cloud provider API 324A of cloud provider data center 304A, but not cloud provider API 324B, when updating a state of an existing VM or creating a new VM.

Secure/trusted boot server 320 may be a physical machine or a virtual machine running a secure server (e.g., Hypertext Transfer Protocol Secure (HTTPS) server) and be used to implement a secure boot process. An example of a secure boot process is described in commonly assigned U.S. patent application Ser. No. 13/422,713 titled "Secure Network Cloud Architecture," the contents of which are incorporated herein by reference in their entirety. Other secure boot processes may also be used. In an example, secure/trusted boot server 320 may comprise an application server and/or the functionality of an application server. The application server may, in cooperation with a cloud orchestrator client 318, authenticate and/or authorize provisioning requests.

Virtual private cloud 308 may include one or more Cloud VM instances 322 that represent VMs instantiated within a environment for a particular tenant. A single cloud provider data center 304 may, for example, be operating multiple virtual private clouds 308, one for each tenant. In an example, cloud infrastructure 310 may include the hardware and software running instantiated VMs within the virtual private cloud 308. For example, cloud infrastructure 310 may include hardware that executes the software that provides the cloud environment on which VMs within the virtual private cloud 308 operate.

Components depicted in FIG. 3 may be directly coupled with one another via virtual links, physical links, or combinations of both. In some examples, components may be coupled via physical cable, may communicate wirelessly, may communicate via a wired and/or wireless network, and any combination thereof. Communication over any network link (e.g., link created by physical connection, such as network cable or fiber cable, virtual link, and the like.) between components in FIG. 3 optionally may be encrypted for security purposes.

Figure 4A:
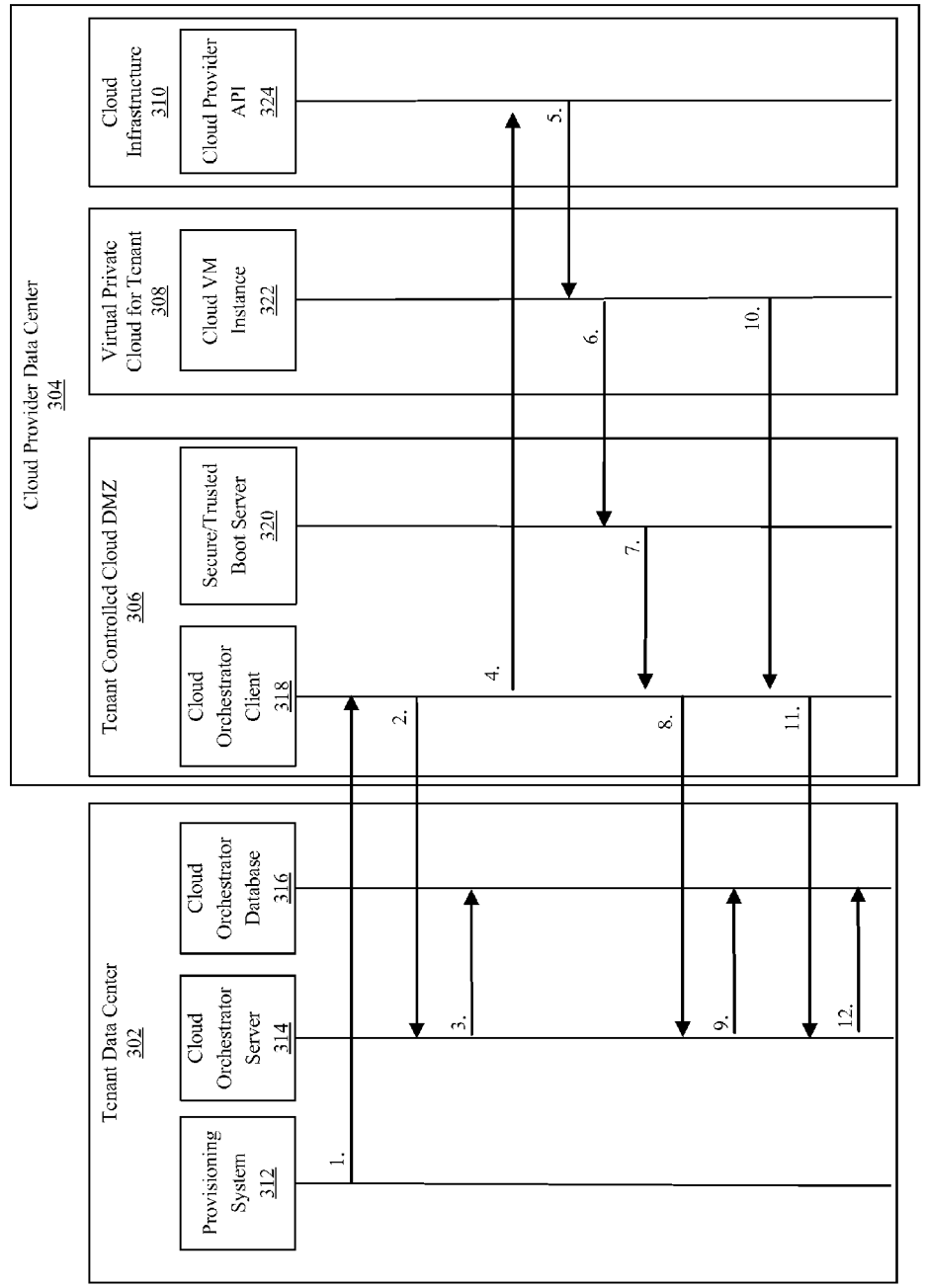
FIGS. 4A-B illustrate example communication flow between components of the system of FIG. 3 for provisioning of a virtual machine, in accordance with example embodiments.

FIG. 4A illustrates example communication flow between components of system 300 for provisioning of a virtual machine, in accordance with example embodiments. As discussed below in further detail, provisioning system 312 may include a provisioning tool that tenant users may use to provision virtual machines within a cloud environment.

With reference to element 1, a tenant user may use provisioning system 312 to issue a provisioning request to provision a new virtual machine and/or change a state of an existing virtual machine. Examples of states of a virtual machine may include: Being created; Created/Powered Off; Powered On; Starting; Running; Shutting Down; Being Deleted, and the like. When provisioning a virtual machine, provisioning system 312 may process a list of available cloud orchestrator clients 318 as well as information about each client 318. For example, the information may include a network address of each client 318, a capacity of each cloud environment a client 318 serves, a type of virtual machine client 318 is able to create (e.g., based on requested operating system images, memory size, CPU count, and the like). Provisioning system 312 may use the information to intelligently select which cloud orchestrator client 318 to use when creating a new virtual machine.

In an example, cloud provider data centers 304 may be placed in different geographic locations and may include hardware optimized for performing certain computational tasks. For instance, cloud provider data center 304A may be located in Miami, Fla. and may include hardware optimized for performing software development tasks, and cloud provider data center 304B may be located in Richmond, Va. and may include hardware optimized for performing product development tasks. In some examples, performance of some tasks may be time sensitive, and hence provisioning system 312 may select a geographically closest cloud provider data center 304 to provision a VM to reduce the amount of time required to communicate data between the tenant data center 302 and cloud provider data center 304. In some other time-sensitive examples, geographic distance may be less important than hardware optimized for performing certain software tasks. Provisioning system 312 may select a cloud provider data center 304 having hardware optimized for performing certain software tasks, even if another cloud provider data center 304 is geographically closer, when provisioning a VM. Provisioning system 312 may also balance network delay and hardware optimization when determining which cloud provider data center 304 to select.

When a particular client 318 has been selected, provisioning system 312 may process the list of available clients 318 to determine a network address associated with the selected client 318. For example, a network address of each cloud orchestrator client 318 may provide routing and destination information. The routing and destination information may be handled by underlying network architecture and its implementation. Provisioning system 312 may not have any specific information about how to reach and communicate with client 318 other than its network address. The network on which provisioning system 312 is operating may automatically determine and route all requests to a particular client based on its network address. Provisioning system 312 may generate a provisioning request that includes the network address and an instruction to provision a new VM or to change the state of an existing VM.

In an example, provisioning system 312 may request a selected client 318 to provision a VM by directly calling a provisioning tool extension on a segment of an internal network of the tenant data center 302. The provisioning tool extension may provide for integration of provisioning system 312 with the cloud orchestrator client 318 (e.g., how to format the provisioning request into a format that cloud orchestrator client understands). In an example, the provisioning tool extension may be installed as part of provisioning system 312 within tenant data center 302. Provisioning system 312 may directly call the provisioning tool extension as if calling any other internal module (e.g., may be an internal procedure call rather than a network call). The provisioning tool extension may be designed and implemented using the requirements provided by provisioning system 312.

Due to provisioning system 312 having a list of available clients 318 with information on their respective network addresses, the provisioning request may be routed from the provisioning system 312 to the desired client 318 using standard network routing, such as, for example, a remote procedure call that includes the network address. In an example, provisioning system 312 may issue a remote procedure call when instructing a selected cloud orchestrator client 318 to provision a new VM or to update an existing VM. In another example, provisioning system 312 may use a plugin to issue a remote procedure call that is forwarded to cloud orchestrator client 318 in Cloud DMZ 306.

Advantageously, by provisioning system 312 being aware of network addresses for each of the cloud orchestrator clients 318, provisioning system 312 may route provisioning requests to a desired client 318 independent of cloud orchestrator server 314. Thus, provisioning system 312 may bypass cloud orchestrator server 314 during requesting of provisioning and hence server 314 does not have to make routing determinations as to which client 318 a provisioning request should be routed.

With reference to element 2, cloud orchestrator client 318 optionally may, upon receipt of the provisioning request, contact cloud orchestrator server 314 requesting approval to provision a VM. In an example, client 318 may issue a boot authorization request (e.g., using a remote procedure call) to confirm with cloud orchestrator server 314 that provisioning a VM is permitted. Server 314 may approve or veto the request, or may modify the request. When modifying a request, for example, if provisioning system 312 requested to create 100 VMs, but the user has permission to create only 20 or if the client has remaining capacity (based on procured capacity) to handle only 20, server 314 may modify the request to allow client to create only 20 VMs. In additional aspects, cloud orchestrator server 314 may confirm/veto each provisioning request based on a finite state diagram enforced by server 314 for a secure boot process. In an example, a finite state diagram may indicate a set of allowed states in which a virtual machine may operate and allowed transitions between these states. For instance, allowed states for a VM may include: Requested, Being Created, Powered Off, Powered On, Starting, Running, Shutting Down, and the like. In further aspects, server 314 may only allow certain transitions between the allowed states. For example, finite state diagram may require that a VM pass sequentially through each of the allowed states, and may prevent the VM from skipping a state in the sequence (e.g., transitioning from 'Requested' directly to 'Shutting Down,' and skipping all intermediate states). As noted above, an example of a secure boot process is described in commonly assigned U.S. patent application Ser. No. 13/422,713 titled "Secure Network Cloud Architecture." Other secure boot processes may also be used.

If approving the provisioning request and with reference to element 3, server 314 may update a global record stored by database 316. In an example, database 316 may be a centralized repository of information on virtual machines that have been provisioned. The global record may include, for example, data identifying virtual machines that have been provisioned, their current states, and on which of cloud provider data centers 304 the virtual machines are running.

In reply to the provisioning request, cloud orchestrator server 314 may provide some or all resources for provisioning the VM in the cloud provider data center 304. For example, server 314 may translate the name of an operating system (OS) image requested by provisioning system 312 to the name of an OS image that is actually available at a given cloud provider data center. Cloud orchestrator server 314 may issue an authorization approval response (e.g., a remote procedure call) to provide client 318 with information used for provisioning of a VM. For example, server 314 may provide client 318A with an account name and password to use when connecting to cloud provider API 324A.

Advantageously, rather than a single cloud orchestrator client 318 acting as a dispatcher for multiple cloud providers and APIs 324, individual cloud orchestrator clients 318A-B may call a single cloud orchestrator server 314 to enforce policy, but otherwise each cloud orchestrator client 318 may act independent of other cloud orchestrator clients. Further, cloud orchestrator server 314 may be independent of the cloud provider data centers 304A-B. This model may provide greater scalability and resiliency, as compared to single central orchestrator client model, since multiple cloud orchestrator clients 318 may act independently of each other and each may be used by multiple provisioning systems 312.

With reference to element 4 and optionally in response to receiving an approval message from cloud orchestrator server 314, cloud orchestrator client 318 may instruct cloud provider API 324 operating on cloud infrastructure 310 to create a new virtual machine or change the state of an existing virtual machine. For example, client 318 may translate and/or interpret the provisioning request into instructions for instructing cloud provider API 324 to perform certain operations. In an example, provisioning system 312 may communicate a provisioning request that requests creation of a VM, and cloud orchestrator client 318 may execute a series of API calls to satisfy the request. Example API calls may include to obtain an internet protocol (IP) address, allocate disk space, and then create a VM using the IP address and the disk space. In another example, example, client 318 may issue a remote procedure call that is forwarded to cloud provider API 324 in cloud provider data center 304.

With reference to element 5 and in response to the provisioning request, cloud infrastructure 310 may create a new virtual machine or update the state of an existing virtual machine within the virtual private cloud 308. Cloud VM instance 322 may, for example, represent a newly created VM or an existing VM that is being updated.

Figure 4B:
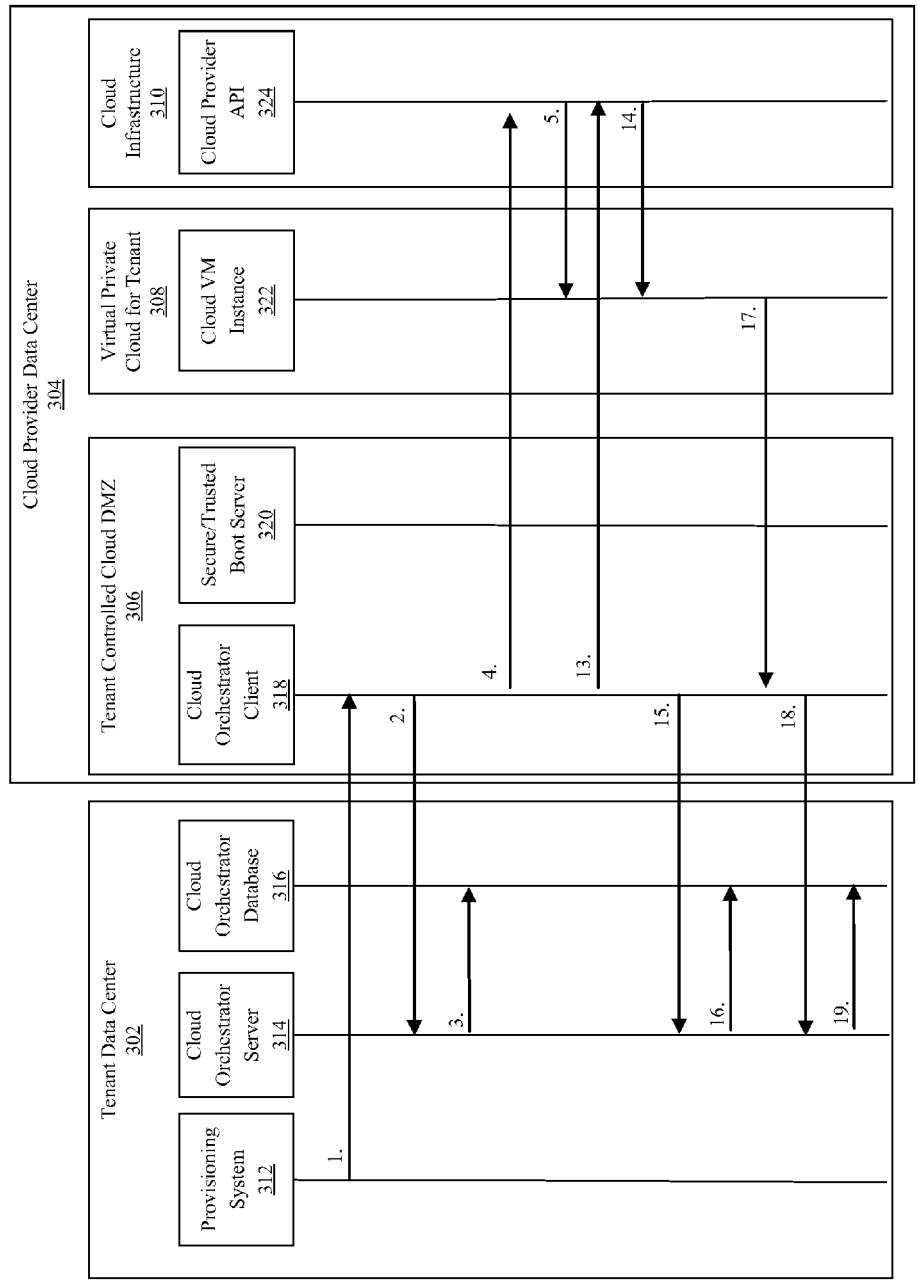

Elements 6-9 of FIG. 4A described below may apply to creation of a new virtual machine. If the state of an existing VM is being updated, elements 6-9 may be skipped and communication flow may proceed directly to element 10 in one embodiment. FIG. 4B, described subsequent to FIG. 4A, provides an alternative or additional embodiment where elements 13-19 may replace elements 6-12 for when a state of an existing VM is being updated.

In FIG. 4A, with reference to element 6, cloud VM instance 322 may use a secure boot process to boot a newly provisioned virtual machine in a trustworthy way. To do so, cloud VM instance 322 may communicate a request to boot a new virtual machine to secure/trusted boot server 320 in initiate a secure boot process. An example secure boot process is described in commonly assigned U.S. patent application Ser. No. 13/422,713 titled "Secure Network Cloud Architecture." Other secure boot processes may also be used.

With reference to element 7, secure/trusted boot server 320 may verify with the cloud orchestrator client 318 whether the boot attempt is valid and legitimate. An example of verifying whether a boot attempt is valid and legitimate is described in commonly assigned U.S. patent application Ser. No. 13/422,713 titled "Secure Network Cloud Architecture." Verifying may also be performed in other manners.

With reference to element 8, cloud orchestrator client 318 may defer to or update cloud orchestrator server 314 about the attempt to boot the newly provisioned virtual machine. When updating, client 318 may forward data to the server 314 about the boot attempt. For example, if encryption is used, the data may include encryption keys to unlock an encrypted disk. The data may also include a reservation which may include a collection of data used to boot the VM. In an example, server 314 may be responsible for managing and providing reservations to client 318. In another example, client 318 may issue a remote procedure call to inform cloud orchestrator server 314 of a current status of booting of a VM. When deferring, client 318 may forward data included in the provisioning request described above with reference to element 1 and wait for acknowledgement from server 314 that booting of a new virtual machine was desired and initiated by provisioning system 312. Upon receipt, server 314 may confirm that database 316 includes data indicating that provisioning system 312 requested the provisioning and compare that data with data provided by client 318. For example, server 314 may either: (1) find a match and communicate to client 318 a reply authorizing the booting to continue, or (2) not find a match and communicate to client 318 a reply denying authorization to complete the secure boot process. If denied, client 318 may terminate the booting. Denial of booting may occur, for example, as the result of receiving an erroneous provisioning request in element 1 or due to a malicious party attempting to boot a virtual machine within the cloud provider data center 304.

With reference to element 9, cloud orchestrator server 314 may update database 316 to include the data received from client 318 in element 8 and/or to indicate whether there was a match between the data and data previously stored in database 316. The update may also include information about the boot attempt, and whether the boot attempt was successful.

With reference to element 10, Cloud VM instance 322 may notify cloud orchestrator client 318 about its readiness status and/or about an update to its state. For example, if the newly created virtual machine is eventually started, Cloud VM instance 322 may notify cloud orchestrator client 318 about its readiness status. In an example, Cloud VM instance 322 may connect to an internal network of tenant data center 302 by establishing secure tunnel, as described in U.S. patent application Ser. No. 13/422,713. Example readiness statuses may include: (1) a VM is still booting, (2) a VM has properly booted and is ready to receive a workload for execution, and (3) a VM did not properly boot. Additionally, Cloud VM instance 322 may notify the cloud orchestrator client 318 as statuses change during the secure boot process. In further examples, Cloud VM instance 322 may be an existing VM and may notify cloud orchestrator client 318 about an update to its state. Examples of states of a virtual machine may include: Being created; Created/Powered Off; Powered On; Starting; Running; Shutting Down; Being Deleted, and the like.

With reference to element 11, cloud orchestrator client 318 may defer to or update cloud orchestrator server 314 about the attempt to boot the provisioned virtual machine, in a manner similar to that described above with reference to element 8. In an example, during booting of the VM, client 318 may notify server 314 about the readiness of the VM. The VM may communicate with the cloud provider client 318 regarding any state changes it is encountering (e.g., unlocking the encrypted disk or creation of secure tunnel), and client 318 may notify cloud orchestrator server 314 about these changes and/or allow server 314 to react to these changes. For example, client 318 may issue a remote procedure call to inform cloud orchestrator server 314 of a current status (e.g., in-progress, successful, unsuccessful) of booting of a VM. Client 318 may also issue a remote procedure call to provisioning system 312 informing of a current status (e.g., in-progress, successful, unsuccessful) of booting of a VM. For example, client 318 may communicate a message to provisioning system 312 confirming that a virtual machine has been successfully created or has been successfully updated in the cloud environment. If problems were encountered, the message may instead indicate that a virtual machine was not created or updated, and provide information identifying the problem. With reference to element 12, cloud orchestrator server 314 may query or update database 316, as described above with reference to element 9.

FIG. 4B illustrates an example communication flow between components of the system of FIG. 3 for provisioning of a virtual machine, in accordance with example embodiments. Elements 1-5 of FIG. 4B may correspond to description above of the same elements in FIG. 4A as they relate to updating an existing virtual machine. Elements 13-19 may correspond to alternative and/or additional communication flow for updating a state of an existing VM.

With reference to element 13, cloud orchestrator client 318 may poll the cloud provider API 324 to determine a current state of the existing VM. With reference to element 14, cloud provider API 324 may poll the Cloud VM Instance 322 to determine a current state of the existing VM and may inform client 318 of the current state. With reference to element 15, cloud orchestrator client 318 may, upon receiving the current state of the existing VM from cloud provider API 324, notify the cloud orchestrator server 314 about the current state of the existing VM and whether the update was successful. With reference to element 16, cloud orchestrator server 314 may update database 316 to include the current state of the existing VM and whether the update was successful.

With reference to element 17, Cloud VM instance 322 may notify cloud orchestrator client 318 about an update to its state and an attempt to boot the VM using the updated state. Examples of states of a virtual machine may include: Being created; Created/Powered Off; Powered On; Starting; Running; Shutting Down; Being Deleted, and the like.

With reference to element 18, cloud orchestrator client 318 may defer to or update cloud orchestrator server 314 about the attempt to boot the virtual machine with the updated state. In an example, during booting of the VM, client 318 may notify server 314 about the readiness of the VM. The VM may communicate with the cloud provider client 318 regarding any state changes it is encountering (e.g., unlocking the encrypted disk or creation of secure tunnel), and client 318 may notify cloud orchestrator server 314 about these changes and/or allow server 314 to react to these changes. For example, client 318 may issue a remote procedure call to inform cloud orchestrator server 314 of a current status (e.g., in-progress, successful, unsuccessful) of booting of a VM. Client 318 may also issue a remote procedure call to provisioning system 312 informing of a current status (e.g., in-progress, successful, unsuccessful) of booting of a VM. For example, client 318 may communicate a message to provisioning system 312 confirming that a virtual machine has been successfully created or has been successfully updated in the cloud environment. If problems were encountered, the message may instead indicate that a virtual machine was not updated, and provide information identifying the problem. With reference to element 19, cloud orchestrator server 314 may query or update database 316 to indicate whether booting of the VM having an updated state was successful. The communication flow described in elements 13-19 of FIG. 4B may be performed one or more times until client 318 (or other component) determines that a state of an existing VM has been successfully changed or determining that the change of state operation has failed.

The communication flow described in FIGS. 4A-B may be repeated one or more times to provision multiple VMs at a single cloud provider data center 304, and also to provision at least one VM at a multiple cloud provider data centers 304. Provisioning system 312 may also generate a provisioning request requesting simultaneous or sequential provisioning of multiple VMs by one or more cloud provider data centers 304.

As such, upon completion of the secure boot process, a provisioned virtual machine appears to exist in a specific Cloud DMZ and hence on an internal network of the tenant data center 302, even though in fact the virtual machine may run on the cloud provider data center 304. To the user, provisioning system 312 may appear to be provisioning VMs locally on an internal network of the tenant data center 302, when the VMs are actually being provisioned by the cloud provider data center 304. The tenant user, and even provisioning system 312, may not be aware that provisioning of the VM is actually occurring on a cloud provider data center 304. Instead, provisioning system 312 may provision a VM on a particular internal network segment which maps to a specific cloud environment. This approach may make the VM appear as just another server on a specific segment of an internal network on the tenant data center 302.

Figure 5:
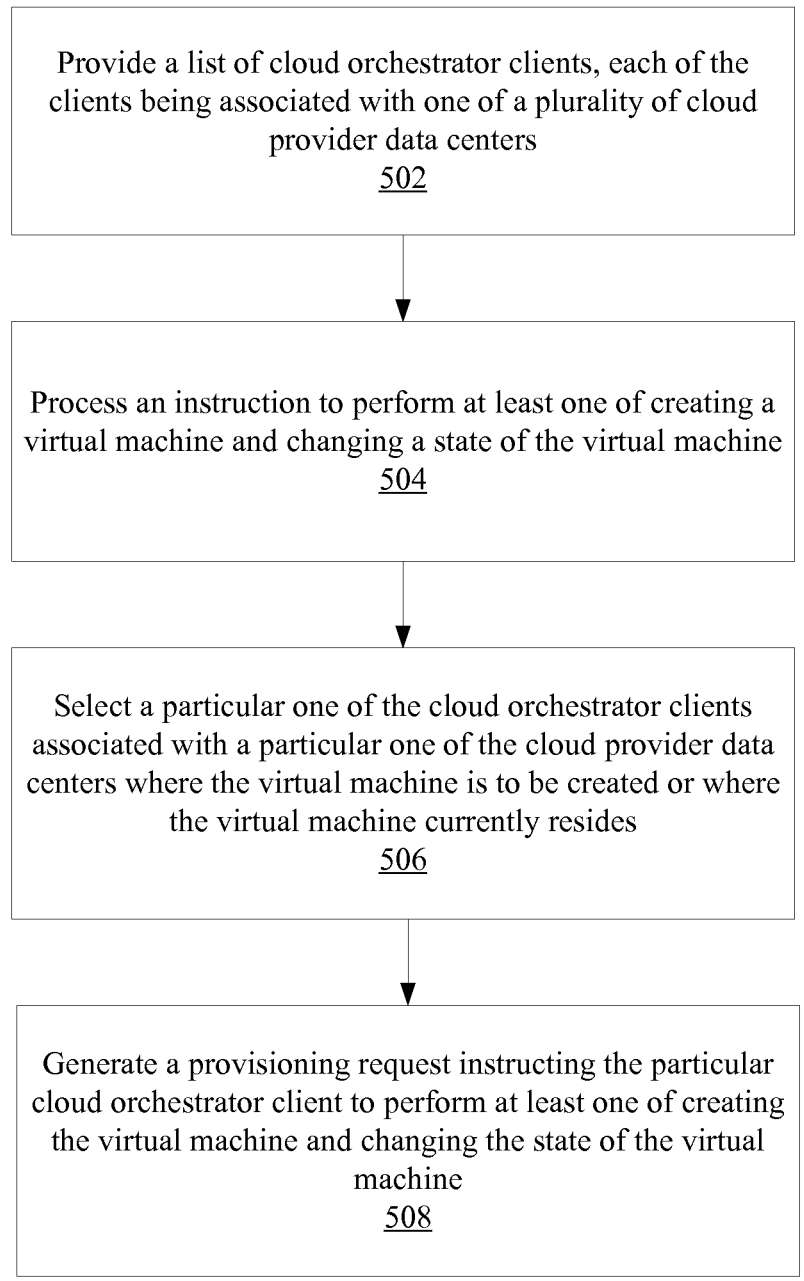
FIG. 5 illustrates an example flow diagram of a method in accordance with example embodiments.

FIG. 5 illustrates an example flow diagram of a method, in accordance with example embodiments. The method may be performed by a single apparatus such as, for example, a computer, server, or other computational device. For example, the method may be implemented by a single apparatus (e.g., computer) performing the functions of the provisioning system, discussed above. The method also may be implemented using two or more devices (e.g., two or more processors, systems, apparatuses, and the like). The order of the blocks shown in FIG. 5 is an example. The blocks may be arranged in other orders, each function described in each block may be performed one or more times, some blocks may be omitted, and/or additional blocks may be added. The method may begin at block 502.

In block 502, the method may include providing a list of cloud orchestrator clients, each of the clients being associated with one of a plurality of cloud provider data centers. For example, provisioning system 312 may determine a list of multiple cloud orchestrator clients 318A-B on which a VM may be provisioned. The list may provide a network address for each of the clients 318A-B.

In block 504, the method may include processing an instruction to perform at least one of creating a virtual machine and changing a state of the virtual machine. In an example, provisioning system 312 may process an instruction from a tenant user to perform at least one of creating a virtual machine and changing a state of a virtual machine.

In block 506, the method may include selecting a particular one of the cloud orchestrator clients associated with a particular one of the cloud provider data centers where the virtual machine is to be created or where the virtual machine currently resides. In an example, provisioning system 312 may select a particular one of the cloud orchestrator clients (e.g., client 318A) associated with a particular cloud provider data center (e.g., data center 304A) where the virtual machine is to be created or where the virtual machine currently resides. Client 318A may be selected, for example, based on geographic proximity of cloud provider data center 304A relative to tenant data center 302, based on hardware available at cloud provider data center 304A, based on user input, and the like.

In block 508, the method may include generating a provisioning request instructing the particular cloud orchestrator client to perform at least one of creating the virtual machine and changing the state of the virtual machine, and communicating the request to the particular cloud orchestrator client. In an example, provisioning system 312 may generate a provisioning request instructing cloud orchestrator client 318A to create a virtual machine and/or to change a state of an existing virtual machine. The provisioning request may be, for example, a remote procedure call that includes a network address of the client 318A. Provisioning system 312 may then communicate the request to client 318. The method may end, may return to any of the preceding steps, or may repeat one or more times.

Figure 6:
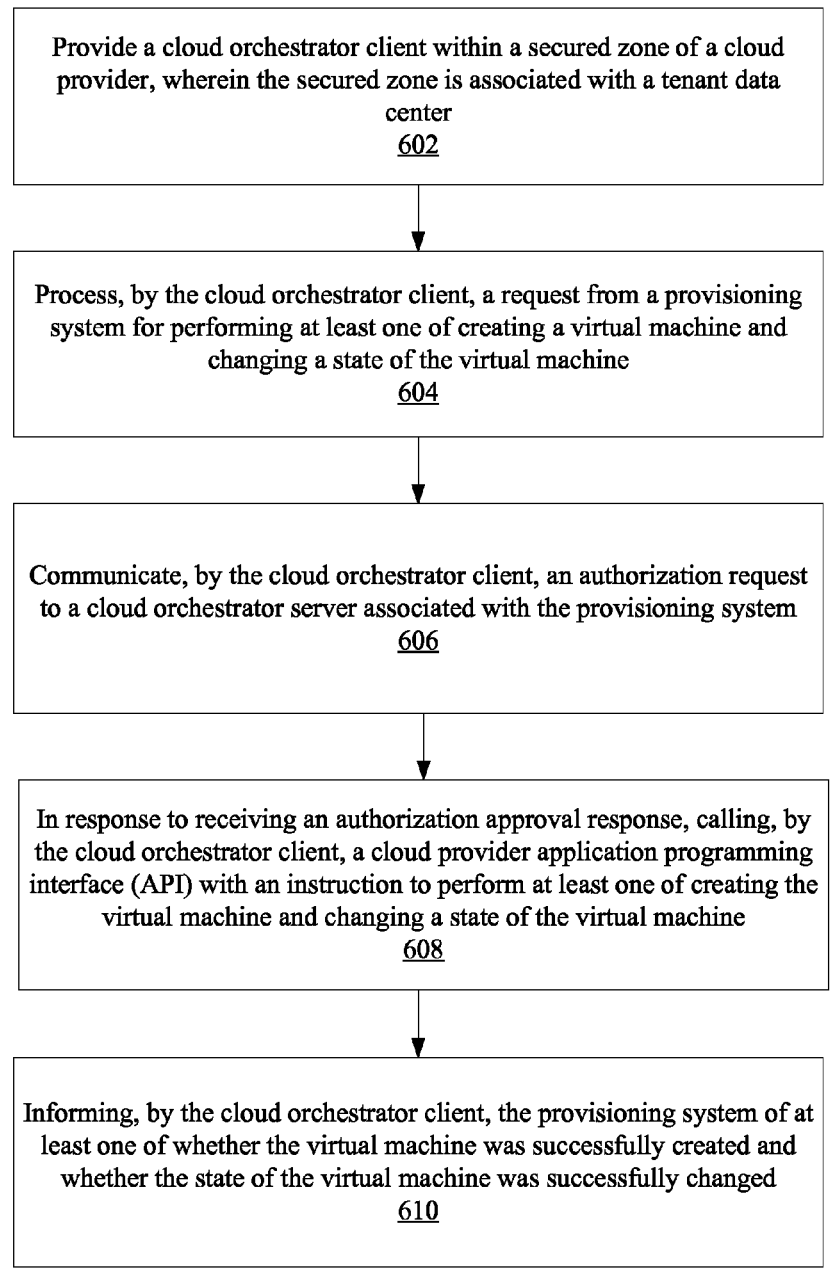
FIG. 6 illustrates an example flow diagram of a method in accordance with example embodiments.

FIG. 6 illustrates an example flow diagram of a method in accordance with example embodiments. The method may be implemented by a single apparatus such as, for example, a computer, server, or other computational device. For example, a single apparatus (e.g., computer) may perform the functions of the cloud provider data center. The method also may be implemented using two or more devices (e.g., two or more processors, systems, apparatuses, and the like). The order of the blocks shown in FIG. 6 is an example. The blocks may be arranged in other orders, each function described in each block may be performed one or more times, some blocks may be omitted, and/or additional blocks may be added. The method may begin at block 602.

In block 602, the method may include providing a cloud orchestrator client within a secured zone of a cloud provider, wherein the secured zone is associated with a tenant data center. In an example, cloud provider data center 304 may implement a cloud orchestrator client 318 within a tenant controlled cloud DMZ 306. A provisioning system 312 of a tenant data center 302 may utilize cloud orchestrator client 318 for provisioning of VMs within the cloud provider data center 304.

In block 604, the method may include processing, by the cloud orchestrator client, a request from a provisioning system for performing at least one of creating a virtual machine and changing a state of the virtual machine. In an example, cloud orchestrator client 318 may process a provisioning request received from provisioning system 312 for creating a virtual machine and/or changing a state of a virtual machine. The provisioning request may be, for example, a remote procedure call.

In block 606, the method may include communicating, by the cloud orchestrator client, an authorization request to a cloud orchestrator server associated with the provisioning system. In an example, cloud orchestrator client 318 may communicate an authorization request to cloud orchestrator server 314 associated with provisioning system 312.

In block 608, the method may include, in response to receiving an authorization approval response, calling, by the cloud orchestrator client, a cloud provider application programming interface with an instruction to perform at least one of creating the virtual machine and changing a state of the virtual machine. In an example, cloud orchestrator client 318 may receive an authorization approval response from cloud orchestrator server 314. The authorization approval response may be, for example, a remote procedure call that includes information to be used when provisioning the VM.

In block 610, the method may include informing, by the cloud orchestrator client, the provisioning system of at least one of whether the virtual machine was successfully created and whether the state of the virtual machine was successfully changed. In an example, cloud orchestrator client 318 may inform provisioning system 312 of whether the virtual machine was successfully created and/or whether the state of the virtual machine was successfully changed. The method may end, may return to any of the preceding steps, or may repeat one or more times.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

The invention claimed is:

1. An apparatus comprising:
   at least one processor; and
   at least one memory storing instructions that, when executed by the at least one processor, cause the apparatus to:
   provide a list of a plurality of cloud orchestrator clients associated with a plurality of cloud provider data centers;
   responsive to unlocking of an encrypted disk, process an instruction, included in a boot authorization request issued by a cloud orchestrator client of the plurality of cloud orchestrator clients using a remote procedure call comprising the instruction, to change a state of a virtual machine from a first state to a second state;
   responsive to receiving, from a cloud orchestrator server, an approval response for the boot authorization request, call the remote procedure call comprising the instruction;
   responsive to the remote procedure call being called, select, from the list, a particular cloud orchestrator client of the plurality of cloud orchestrator clients that is associated with a particular cloud provider data center of the plurality of cloud provider data centers where the virtual machine currently resides; and
   responsive to a determination that changing the state of the virtual machine from the first state to the second state is authorized by a finite state diagram indicating a plurality of allowed states for the virtual machine and a plurality of allowed transitions between the plurality of allowed states:
   generate a request instructing the particular cloud orchestrator client to change the state of the virtual machine from the first state to the second state;
   communicate the request to the particular cloud orchestrator client; and
   receive, from the particular cloud orchestrator client, an indication of whether the state of the virtual machine was successfully changed.

2. The apparatus of claim 1, wherein the instructions, when executed by that at least one processor, cause the apparatus to select the particular cloud orchestrator client based on a network address associated with the particular cloud orchestrator client.

3. The apparatus of claim 1, wherein the instructions, when executed by that at least one processor, cause the apparatus to select the particular cloud orchestrator client based on a geographic distance between the apparatus and the particular cloud provider data center.

4. The apparatus of claim 1, wherein the instructions, when executed by that at least one processor, cause the apparatus to select the particular cloud orchestrator client based on hardware available for performing computational tasks at the particular cloud provider data center.

5. The apparatus of claim 1, wherein the instructions, when executed by the at least one processor, cause the apparatus to select a different cloud orchestrator client of the plurality of cloud orchestrator clients, the different cloud orchestrator client being associated with a different cloud provider data center of the plurality of cloud provider data centers where a different virtual machine resides.

6. The apparatus of claim 5, wherein the instructions, when executed by the at least one processor, cause the apparatus to:

generate a request instructing the different cloud orchestrator client to change a state of the different virtual machine; and communicate, to the different cloud orchestrator client, the request instructing the different cloud orchestrator client to change the state of the different virtual machine.

7. The apparatus of claim 6, wherein the instructions, when executed by the at least one processor, cause the apparatus to determine that changing the state of the different virtual machine is authorized by the finite state diagram.

8. A method, comprising:

providing, by a computing system, a list of a plurality of cloud orchestrator clients associated with a plurality of cloud provider data centers;

responsive to unlocking of an encrypted disk, processing, by the computing system, an instruction, included in a boot authorization request issued by a cloud orchestrator client of the plurality of cloud orchestrator clients using a remote procedure call comprising the instruction, to change a state of a virtual machine from a first state to a second state;

responsive to receiving, by the computing system and from a cloud orchestrator server, an approval response for the boot authorization request, calling, by the computing system, the remote procedure call comprising the instruction;

responsive to the remote procedure call being called, selecting, by the computing system and from the list, a particular cloud orchestrator client of the plurality of cloud orchestrator clients that is associated with a particular cloud provider data center of the plurality of cloud provider data centers where the virtual machine currently resides; and responsive to a determination, by the computing system, that changing the state of the virtual machine from the first state to the second state is authorized by a finite state diagram indicating a plurality of allowed states for the virtual machine and a plurality of allowed transitions between the plurality of allowed states:

generating, by the computing system, a request instructing the particular cloud orchestrator client to change the state of the virtual machine from the first state to the second state;

communicating, by the computing system, the request to the particular cloud orchestrator client; and receiving, by the computing system and from the particular cloud orchestrator client, an indication of whether the state of the virtual machine was successfully changed.

9. The method of claim 8, comprising selecting the particular cloud orchestrator client based on a network address associated with the particular cloud orchestrator client.

10. The method of claim 8, comprising selecting the particular cloud orchestrator client based on a geographic distance between the computing system and the particular cloud provider data center.

11. The method of claim 8, comprising selecting the particular cloud orchestrator client based on hardware available for performing computational tasks at the particular cloud provider data center.

12. The method of claim 8, comprising selecting, by the computing system, a different cloud orchestrator client of the plurality of cloud orchestrator clients, the different cloud orchestrator client being associated with a different cloud provider data center of the plurality of cloud provider data centers where a different virtual machine resides.

13. The method of claim 12, comprising:

generating, by the computing system, a request instructing the different cloud orchestrator client to change a state of the different virtual machine; and communicating, by the computing system and to the different cloud orchestrator client, the request instructing the different cloud orchestrator client to change the state of the different virtual machine.

14. The method of claim 13, comprising determining, by the computing system, that changing the state of the different virtual machine is authorized by the finite state diagram.

15. One or more non-transitory computer-readable media having instructions stored thereon that when executed by one or more computers cause the one or more computers to:

provide a list of a plurality of cloud orchestrator clients associated with a plurality of cloud provider data centers;

responsive to unlocking of an encrypted disk, process an instruction, included in a boot authorization request issued by a cloud orchestrator client of the plurality of cloud orchestrator clients using a remote procedure call comprising the instruction, to change a state of a virtual machine from a first state to a second state;

responsive to receiving, from a cloud orchestrator server, an approval response for the boot authorization request, call the remote procedure call comprising the instruction;

responsive to the remote procedure call being called, select, from the list, a particular cloud orchestrator client of the plurality of cloud orchestrator clients that is associated with a particular cloud provider data center of the plurality of cloud provider data centers where the virtual machine currently resides; and responsive to a determination that changing the state of the virtual machine from the first state to the second state is authorized by a finite state diagram indicating a plurality of allowed states for the virtual machine and a plurality of allowed transitions between the plurality of allowed states:

generate a request instructing the particular cloud orchestrator client to change the state of the virtual machine from the first state to the second state;

communicate the request to the particular cloud orchestrator client; and receive, from the particular cloud orchestrator client, an indication of whether the state of the virtual machine was successfully changed.

16. The one or more non-transitory computer-readable media of claim 15, wherein the instructions, when executed by the one or more computers, cause the one or more computers to select the particular cloud orchestrator client based on a network address associated with the particular cloud orchestrator client.

17. The one or more non-transitory computer-readable media of claim 15, wherein the instructions, when executed by the one or more computers, cause the one or more computers to select the particular cloud orchestrator client based on a geographic distance between the one or more computers and the particular cloud provider data center.

18. The one or more non-transitory computer-readable media of claim 15, wherein the instructions, when executed by the one or more computers, cause the one or more computers to select the particular cloud orchestrator client based on hardware available for performing computational tasks at the particular cloud provider data center.

19. The one or more non-transitory computer-readable media of claim 15, wherein the instructions, when executed by the one or more computers, cause the one or more computers to:
- select a different cloud orchestrator client of the plurality of cloud orchestrator clients, the different cloud orchestrator client being associated with a different cloud provider data center of the plurality of cloud provider data centers where a different virtual machine resides;
- generate a request instructing the different cloud orchestrator client to change a state of the different virtual machine; and
- communicate, to the different cloud orchestrator client, the request instructing the different cloud orchestrator client to change the state of the different virtual machine.

20. The one or more non-transitory computer-readable media of claim 19, wherein the instructions, when executed by the one or more computers, cause the one or more computers to determine that changing the state of the different virtual machine is authorized by the finite state diagram.

* * * * *